March 6, 1956   E. MILLET   2,737,098
STEREOSCOPIC CAMERAS

Filed April 9, 1952   3 Sheets-Sheet 1

INVENTOR
Eugene Millet.
BY
ATTORNEY

March 6, 1956 E. MILLET 2,737,098
STEREOSCOPIC CAMERAS
Filed April 9, 1952 3 Sheets-Sheet 2
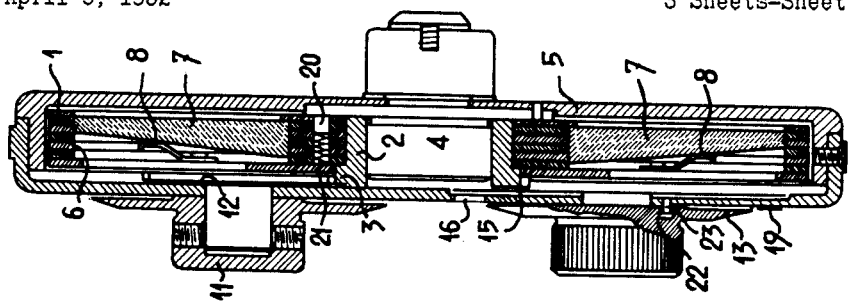
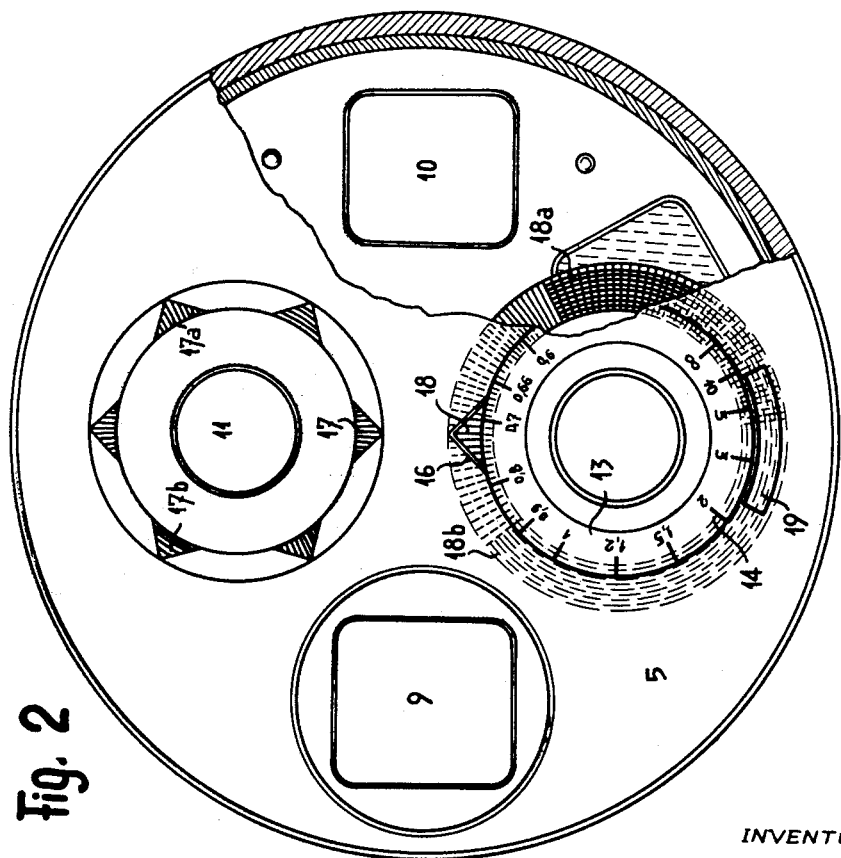
INVENTOR
Eugene Millet.
BY
ATTORNEY March 6, 1956  E. MILLET  2,737,098
STEREOSCOPIC CAMERAS
Filed April 9, 1952  3 Sheets-Sheet 3

INVENTOR
Eugene Millet.

BY

ATTORNEY

United States Patent Office 2,737,098
Patented Mar. 6, 1956

2,737,098
STEREOSCOPIC CAMERAS

Eugéne Millet, Yverdon, Switzerland, assignor to Paillard S. A., Sainte-Croix, Switzerland, a company of Switzerland Application April 9, 1952, Serial No. 281,398

Claims priority, application Switzerland April 13, 1951

6 Claims. (Cl. 95—18)

Stereoscopic cameras are generally fitted with two photographing objectives $O_1$, $O_2$ spaced a fixed distance apart and with two projection apertures $F_1$ and $F_2$ fixed relatively to said objectives (see diagram shown in Fig. 1). Whilst photographing very distant views, the images of the centre A of the object assumed at infinity, are formed at $A_1$ and $A_2$ in the apertures $F_1$ and $F_2$. When photographing at very close range, the images of the centre B of the object assumed to be very close to the camera, are formed at $B_1$ and $B_2$ in the apertures $F_1$ and $F_2$. It will be seen immediately that the distances $A_1A_2$ and $B_1B_2$ are different. When dealing with photographic views, the two left hand and right hand photographs are subjected to a cutting out and a mounting which brings their centres to a give distance from one another for permitting their examination by means of a stereoscope or by means of a stereoscopic projector for stationary views. The case of cinematographic projection is different as the two images are recorded on the same film and there is no possibility of changing the distances $A_1A_2$ and $B_1B_2$ between the operations of photographing and projection. When the distance between the projection objectives is such that the projections of $A_1$ and $A_2$ are substantially superposed on the screen, the projections of the couple $B_1B_2$ are crossed considerably and the eyes of the spectator do not effect the fusion of the two images except with considerable fatigue; a sudden passage from view A to view B is particularly painful. Further, in a camera constructed for views A at considerable distances and used for views B at short distances, the images of the centre of the subject are spaced considerably from the centres of the corresponding apertures of the projector; the two images do not embrace the same field and examination of the left hand and right hand edges of the image projected on the screen is painful.

On the other hand, a suitable stereoscopic perception is only possible when the extreme frontal planes of the subject are located between two well defined limits, and vision is only agreeable when the two images of a frontal plane comprised between these two limits are blended on the screen.

The present invention has for its subject a device for correcting the convergence permitting of obtaining other points of convergence of the optical axes passing through the centre of the apertures of the photographic camera and thus rendering possible the displacement of the limits of depth of the stereoscopic field as a function of the distance of the camera from the subject.

This convergence correcting device for a stereoscopic photographic camera is of the type comprising a support adapted to be mounted in front of the pair of objectives equipping the two photographic apertures of the camera, said support carrying at least one pair of optical elements adapted to deviate symmetrically in direction, one from the other, the beams of the two objectives, in such a manner as to cause the optical axes passing through the centre of the photographing apertures to converge at a predetermined distance from the camera.

This device is characterised in that the said support is constituted by a turret adapted to be mounted pivotally on the front face of the camera, the said optical elements being diametrically opposed relatively to the axis of the turret, this also having two free openings diametrically opposed, the bringing of the said openings opposite the objectives enabling views to be taken at considerable distances, whilst the bringing of the optical elements in front of the objectives by rotation of the turret enables views to be taken at short distances.

One form of construction of the device according to the invention is shown by way of example in the accompanying drawings, wherein:

Fig. 2 is a front view and

Fig. 3 is a view in section on the line III—III of Fig. 2, the support of the optical devices being located in an intermediate position.

Figure 6:
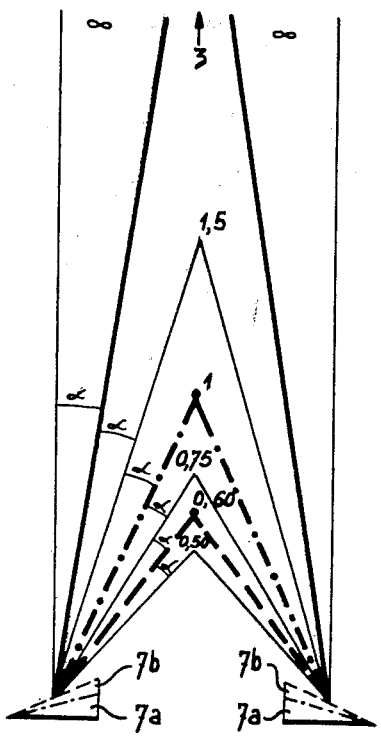
Fig. 6 is an explanatory diagram.

This device comprises a support adapted to be mounted in front of a pair of objectives equipping the two photographing apertures of a camera. In the particular case, this support is formed by a turret 1 adapted to be mounted pivotably on the photographic apparatus. The turret 1 is formed by a pile of cut plates secured to the hub 2 of a toothed wheel 3 mounted in such a manner as to be capable of turning on a spindle 4 secured to a casing 5.

The turret 1 has openings 6 in at least a portion of which are mounted optical elements adapted to deviate symmetrically in direction, from one another, the rays of the two objectives of the photographic camera.

In the form of construction shown, the said optical elements are formed by prisms 7 held in openings 6 by springs 8.

The casing 5 has two windows 9 and 10 adapted to be placed in front of the objectives of the photographic camera during the securing of the correcting device thereto.

An operating knob 11 secured to a toothed wheel 12 gearing with the wheel 3 pivots in the casing 5; said knob 11 is adapted, by being turned, to enable the prisms 7 to be brought successively into the apertures 9 and 10.

Figure 4:
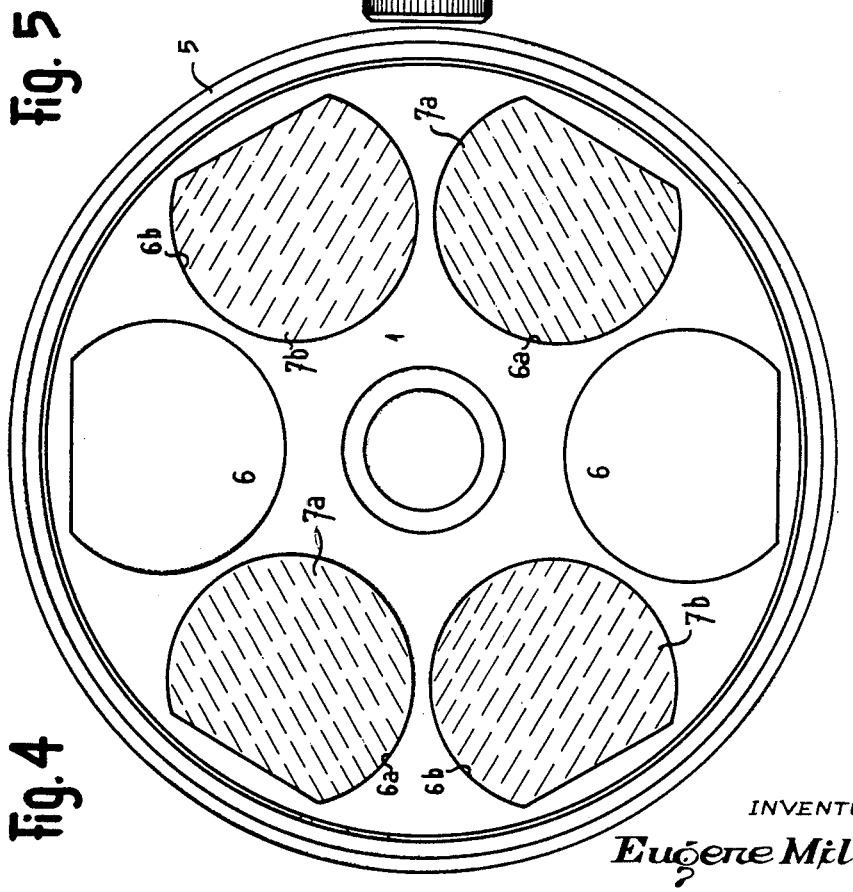
Fig. 4 is a view of the interior of the device.

In this form of construction, the turret has six openings 6 (see Fig. 4). Two diametrically opposite openings are left free. Thus, when they are placed in the openings 9 and 10, their openings allow of the passage of the beams of two objectives of the photographic camera without producing any deviation thereof. As will be seen in Fig. 3, the prisms 7 and the openings 6 left free are displaced angularly relatively to one another by 60°.

When considering the spacing of the objectives to be substantially equal to the spacing of the eyes, the angle of tolerance $2\alpha$ in which photographing of views is admissible is of the order of 70 minutes (see Fig. 6).

The objectives of the photographic camera are so disposed that their beams are convergent at 3 metres. Thus it is possible to effect photographing in a zone depth of stereoscopic field generally comprised between infinity and 1.5 metres.

In the diametrically opposite opening $6a$ are placed two identical prisms $7a$. When the prisms $7a$ are brought into the openings 9 and 10 they deviate in direction, from one another, the beams of the two objectives in such a manner that the said rays converge at a distance of 1 m. in front of the camera. This distance of convergence of 1 m. permits of obtaining, as shown in Fig. 6, a depth of stereoscopic field comprised between 1.5 m. and 0.75 m.

In the openings 6b are placed two identical prisms 7b adapted to cause the beams of the objectives to converge a distance of 0.60 m., this distance of convergence permitting photographing in a depth of field passing from 0.75 m. to 0.50 m.

In order to make it easier for the operator to select prisms which allow of photographing in a given depth of field, the correcting device comprises also, a movable disc 13, pivotally mounted on the casing 5 and carrying a scale 14 indicating the distance of the camera from the object. The disc 13 is secured to a dial 15 located inside the casing 5. An opening 16 pierced in the casing 5 enables a portion of the dial 15 to be seen.

Marks 17, 17a and 17b are represented by triangles in different colours on the operating knob 11. Zones 18, 18a and 18b of corresponding colours are indicated on the dial 15. As shown in the drawing, the correcting device comprises as many marks 17 and 18 as the turret 1 is capable of occupying different operative positions.

Once two corresponding marks, for example 17a and 18a, are brought into register, it is possible to read opposite a zone 19, stationary relatively to the casing 5, the extreme admissible distances of photographing for the respective position of the turret 1. In the particular case this position corresponds with that in which the prisms 7a are in the openings 9 and 10.

As shown in Fig. 3, the turret is held in each of its operative positions by a plunger 20 subjected to the action of a spring 21 and adapted to co-operate with recesses provided in the casing 5.

The disc 13 has an arcuate groove 22 with which engages a pin 23 secured to the casing 5. The rotation of the disc 13 is thus limited to a predetermined angle.

The correcting device is used in the following manner:

Once the device has been secured to the camera and the operator desires to film an object which is located in zone included between 1 m. and 1.5 m., he turns the disc 13 in such a manner as to bring the part of the graduation 14 corresponding to 1 to 1.5 m. opposite the zone 19. A zone of colour 18a will then appear in the opening 16.

The operator then turns the knob 11 in such a manner as to bring the mark 17a of the same colour as 18a opposite the opening 16. In this position the prisms 7a are in the openings 9 and 10. The operator can then set the objectives of the camera in such a manner as to obtain a clear image between 1 and 1.5 m. Once this operation has been completed the photographing can take place.

Figure 7:
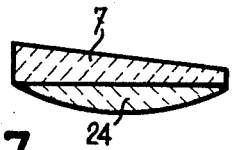
Figs. 7 and 8 show modifications.

In a modification, and to avoid setting the objectives of the camera, it is possible to associate with each prism 7 a converging lens 24 (Fig. 7). The prisms 7a are thus combined with two similar lenses 24a, whilst the prisms 7b are combined with two similar lenses 24b, but of stronger convergence than the lenses 24a.

Figure 8:
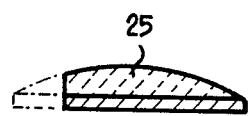
Figure 1:
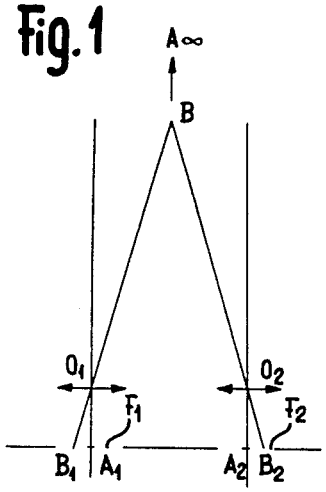
Fig. 1 is an explanatory diagram relating to stereoscopic type cameras.

In a further modification (see Fig. 8), the prisms 7 and the lenses 24 may be replaced by eccentric converging lenses 25, or if necessary also by complete converging lenses mounted in such a manner that their axes do not coincide with the axes of the luminous beams. Such a construction permits of obtaining results similar to those obtained by means of the combination of the prisms 7 and the converging lenses 24.

In another simplified form of construction, the disc 13, the dial 15, the opening 16 and the zone 19 may be omitted. On the central part of the casing 5 are then indicated marks of colours corresponding with that of the mark 17. The extreme admissible distances for photographing are indicated opposite marks represented on the casing 5 and the marks 7 of the operating knob are located in relative positions slightly different from those indicated in Fig. 2. Thus the placing in coincidence of two marks of similar colour of the operating knob and of the casing bring the optical device or devices (7, 7 and 24 or 25) into the window or windows 9 and 10.

In a modification the gears 3 and 12 may be omitted. The operating knob 11 is then secured directly to the turret 1.

Further, the extreme admissible distances of photographing may be indicated directly on the operating knob in the vicinity of the corresponding mark (17, 17a and 17b). The setting in operative position of the turret 1 for a predetermined distance of convergence is then effected by moving to the mark corresponding with this opposite a single pointer secured to the casing 5.

In the form of construction shown, the correcting device was provided with two pairs of optical elements (7, 7 and 24 or 25). However, it will be well understood that instead of two it is even possible to provide a single or even more than two pairs of optical elements.

Figure 5:
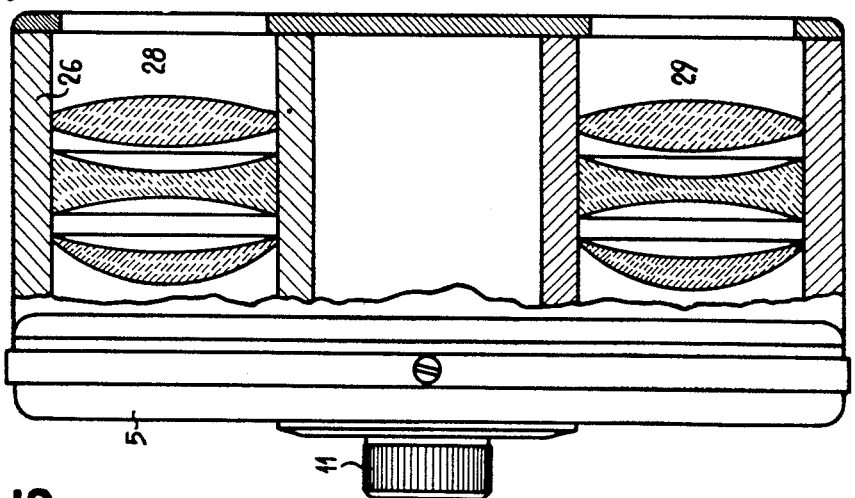
Fig. 5 shows its application to a group of objectives for a camera for taking stereoscopic views.

Further as shown in Fig. 5, the casing 5 may form part of the mounting 26 of the two objectives 28 and 29 of a stereoscopic photographic camera.

It will be understood that numerous modifications in construction may be made. For example, as regards the turret, this, instead of being formed by a pile of plates may naturally be obtained, for example, in one piece by moulding.

Further, the operating knob 11 and the disc 13, instead of being located on the front face of the casing 5 may be located on the side thereof.

I claim:

1. A device for correcting the convergence for a stereoscopic photographic camera, comprising a support adapted to be mounted in front of a pair of objectives equipping the two photographing openings of the camera, said support carrying at least two pairs of optical elements adapted to deviate symmetrically in direction, the one from the other, the beams of the two objectives in such a manner as to cause convergence of the optical axes passing through the centre of said photographing openings at a determined distance from the camera, said support comprising a turret adapted to be mounted pivotally on the front face of the camera, said optical elements being diametrically opposed relatively to the axis of the turret, said turret being also provided with two free openings diametrically opposed, the bringing of said openings opposite said objectives permitting a photographing at considerable distances, whilst the bringing of the said optical elements in front of said objectives, by rotation of said turret, allows of photographing at short distances, each pair of optical deviating elements, being formed by two identical elements which are diametrically opposed relatively to the axis of the turret, the elements of one pair being different from those of the other pair so as to cause at will the said beams to converge successively at two points each located at a determined distance from the camera, a control knob for said turret, said turret being mounted pivotally in the interior of a casing adapted to be secured to the front face of the camera, said casing being provided with two openings located opposite the objectives of the camera, a movable disc on the casing, said disc carrying a scale indicating the distance of the camera from the subject, said control knob actuating said turret through a gear train, said control knob and said movable disc being each provided with as many different marks as the said turret is capable of occupying different active positions, the placing of two corresponding marks of the disc and of the control knob opposite one another permitting of reading on the scale, opposite a zone stationary relatively to the casing, the extreme admissible distances for photographing for the respective position of the turret on the camera.

2. A device for correcting the convergence for a stereoscopic photographic camera, comprising a support adapted to be mounted in front of a pair of objectives equipping the two photographing openings of the camera, said support carrying at least two pairs of optical elements adapted to deviate symmetrically in direction, the one from the other, the beams of the two objectives in such a manner as to cause convergence of the optical axes passing through the centre of said photographing openings at a determined distance from the camera, said support comprising a turret adapted to be mounted pivotally on the front face of the camera, said optical elements being diametrically opposed relatively to the axis of the turret, said turret being also provided with two free openings diametrically opposed, the bringing of said openings opposite said objectives permitting of photographing at considerable distances, whilst the bringing of the said optical elements in front of said objectives, by rotation of said turret, allows of photographing at short distances, each pair of optical deviating elements, being formed by two identical elements which are diametrically opposed relatively to the axis of the turret, the elements of one pair being different from those of the other pair so as to cause at will the said beams to converge successively at two points each located at a determined distance from the camera, a control knob for said turret, said turret being mounted pivotally in the interior of a casing adapted to be secured to the front face of the camera, said casing being provided with two openings located opposite the objectives of the camera, a movable disc provided on the casing, said disc carrying a scale indicating the distance of the camera from the subject, said control knob actuating said turret through a gear train, a said control knob and said movable disc being each provided with as many different marks as the said turret is capable of occupying different active positions, the placing of two corresponding marks of the disc and of the control knob opposite one another permitting of reading on the scale, opposite a zone stationary relatively to said casing, the extreme admissible distances for photographing for the respective position of the turret on the camera, said control knob and said movable disc being located on the front face of the casing, said movable disc being secured to a dial carrying marks corresponding with the marks of said control knob, said dial being located in the interior of the casing and its marks being visible through an opening provided in the wall of said casing.

3. A device for correcting the convergence for a stereoscopic photographic camera, comprising a support adapted to be mounted in front of a pair of objectives equipping the two photographing openings of the camera, said support carrying at least two pairs of optical elements adapted to deviate symmetrically in direction, the one from the other, the beams of the two objectives in such a manner as to cause convergence of the optical axes passing through the centre of said photographing openings at a determined distance from the camera, said support comprising a turret adapted to be mounted pivotally on the front face of the camera, said optical elements being diametrically opposed relatively to the axis of the turret, said turret being also provided with two free openings diametrically opposed, the bringing of said openings opposite said objectives permitting of photographing at considerable distances, whilst the bringing of the said optical elements in front of said objectives, by rotation of said turret, allows of photographing at short distances, each pair of optical deviating elements, being formed by two identical elements which are diametrically opposed relatively to the axis of the turret, the elements of one pair being different from those of the other pair so as to cause at will the said beams to converge successively at two points each located at a determined distance from the camera, a control knob for said turret, said turret being mounted pivotally in the interior of a casing adapted to be secured to the front face of the camera, said casing being provided with two openings located opposite the objectives of the camera, a movable disc provided on said casing, said disc carrying a scale indicating the distance of the camera from the subject, said control knob and said movable disc being each provided with as many different marks as the said turret is capable of occupying different active positions, the placing of two corresponding marks of the disc and of the control knob opposite one another permitting of reading on the scale, opposite a zone stationary relatively to said casing, the extreme admissible distances for photographing for the respective position of the turret on the camera, said control knob and said movable disc being located on the front face of the casing, the movable disc being secured to a dial carrying marks formed by zones of different colors, said marks corresponding with the marks of the control knob, said dial being located in the interior of the casing and its marks being visible through an opening provided in the wall of the casing.

4. A device for correcting the convergence for a stereoscopic photographic camera, comprising a support adapted to be mounted in front of a pair of objectives equipping the two photographing openings of the camera, said support carrying at least two pairs of optical elements adapted to deviate symmetrically in direction, the one from the other, the beams of the two objectives in such a manner as to cause convergence of the optical axes passing through the centre of said photographing openings at a determined distance from the camera, said support comprising a turret adapted to be mounted pivotally on the front face of the camera, said optical elements being diametrically opposed relatively to the axis of the turret, said turret being also provided with two free openings diametrically opposed, the bringing of said openings opposite said objectives permitting of photographing at considerable distances, whilst the bringing of the said optical elements in front of said objectives, by rotation of said turret, allows of photographing at short distances, each pair of optical deviating elements, being formed by two identical elements which are diametrically opposed relatively to the axis of the turret, the elements of one pair being different from those of the other pair so as to cause at will the said beams to converge successively at two points each located at a determined distance from the camera, a control knob for said turret, said turret being mounted pivotally in the interior of a casing adapted to be secured to the front face of the camera, said casing being provided with two openings located opposite the objectives of the camera, said control knob having as many different marks as the turret is capable of occupying different active positions, marks each corresponding to a mark on the knob being represented on the casing, the extreme admissible distances of photographing for the position of the turret corresponding with the placing in coincidence of two similar marks of the control knob and of the casing being indicated opposite one of them.

5. A device for correcting the convergence for a stereoscopic photographic camera, comprising a support adapted to be mounted in front of a pair of objectives equipping the two photographing openings of the camera, said support carrying at least two pairs of optical elements adapted to deviate symmetrically in direction, the one from the other, the beams of the two objectives in such a manner as to cause convergence of the optical axes passing through the centre of said photographing openings at a determined distance from the camera, said support comprising a turret adapted to be mounted pivotally on the front face of the camera, said optical elements being diametrically opposed relatively to the axis of the turret, said turret being also provided with two free openings diametrically opposed, the bringing of said openings opposite said objectives permitting of photographing at considerable distances, whilst the bringing of the said optical elements in front of said objectives, by rotation of said turret, allows of photographing at short distances, each pair of optical deviating elements, being formed by two identical elements which are diametrically opposed relatively to the axis of the turret, the elements of one pair being different from those of the other pair so as to cause at will the said beams to converge successively at two points each located at a determined distance from the camera, a control knob for said turret, said turret being mounted pivotally in the interior of a casing adapted to be secured to the front face of the camera, said casing being provided with two openings located opposite the objectives of the camera, said control knob having as many different marks as the turret is capable of occupying different active positions, the extreme admissible positions of photographing being indicated on the control knob opposite each mark, the setting in the active position of said turret for a determined position of convergence being effected by bringing the mark corresponding to the turret position selected opposite a stationary pointer of the casing.

6. Apparatus for taking stereoscopic pictures comprising a camera including two objectives and two openings each for an objective, a support pivotally mounted on the front of the camera and carrying at least two optical elements in a certain angular position of the support deviating the rays of the objectives and thereby causing the convergence of the optical axes passing through the centers of the openings at a predetermined distance from the camera, the support also having two free openings in a second angular position of the support each registering with an objective and making photographing of distant objects possible, a casing housing the support and having two openings each registering with an objective, a control knob for the support, a movable disc on the casing and carrying a scale indicating the distance of the camera from the object to be photographed, a plurality of marks on the control knob each corresponding to a certain angular position of the support, an equal plurality of marks on the movable disc and each when opposite the corresponding mark on the knob, placing the scale in a position indicating the extreme admissible distance for photographing for the respective angular support position.

References Cited in the file of this patent

UNITED STATES PATENTS

| | | |
|---|---|---|
| 1,705,760 | Griffith | Mar. 19, 1929 |
| 1,922,963 | Lane | Aug. 15, 1933 |
| 2,453,075 | Land | Nov. 2, 1948 |

FOREIGN PATENTS

| | | |
|---|---|---|
| 731,160 | Germany | Feb. 3, 1943 |